Patented Apr. 19, 1927.

1,625,533

UNITED STATES PATENT OFFICE.

HERMANN FRITZSCHE, EDUARD KRUMMENACHER, HANS GUBLER, AND OTTO KAISER, OF BASEL, SWITZERLAND, ASSIGNORS TO SOCIETY OF CHEMICAL INDUSTRY IN BASLE, OF BASEL, SWITZERLAND.

INTERMEDIATE PRODUCT FOR THE SYNTHESIS OF AZO DYES AND PROCESS FOR MAKING SAME.

No Drawing. Application filed July 20, 1923, Serial No. 652,859, and in Switzerland September 7, 1922.

It has been found that new intermediate products for the synthesis of azo-dyes may be obtained by condensing, in a first phase, one molecular proportion of a cyanuric trihalide with one molecular proportion of an aromatic compound having, firstly, a nontertiary amino group, secondly, containing one of a group of auxochromes including

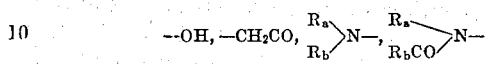

(wherein $R_a$ and $R_b$ represent the same or different alkyl, aryl or aralkyl radicals or a hydrogen atom), and, thirdly, containing still at least one strong acid group, then condensing successively, in the second phase, with the condensation products thus obtained, one of a group of compounds which contains an amino or hydroxy group, condensing, in the third phase, with the condensation products of the second phase, compounds of a group of compounds which contain an amino or hydroxy group.

As compounds which may be employed in the first phase there come particularly into consideration the carboxylic and sulfonic acids of the amino-naphthols, furthermore the sulfonic and carboxylic acids of the diamines of the benzene and naphthalene series, their monoacidyl, monoalkyl, monoaralkyl and monoaryl derivatives and their asymmetric dialkyl or diaralkyl derivatives, respectively, the derivatives of the 1-aryl-5-pyrazolone sulfonic and carboxylic acids which carry amino groups in the aryl nucleus.

As compounds used in the second phase there may be employed not only the compounds of the first phase, but also the unsulfonated and uncarboxylated derivatives of same, furthermore primary and secondary amines such as aniline, toluidine, naphthylamine, the sulfonic and carboxylic acids of same, diamines such as phenylenediamines and toluylenediamines, nitroanilines, phenols, aminophenols, nitrophenols furthermore aliphatic amines, as for instance diethylamines or aliphatic alcohols, and finally ammonia and water.

These condensations may in most cases be carried out by successively stirring the components together in a suitable diluent, and it was surprising to find that as such a medium water is very appropriate. The course of the reaction may be traced either by the quantity of hydrogen halide obtained or by the formation of a precipitate or a clear solution, or by the disappearance of the components.

There are thus obtained intermediate products of the general formula

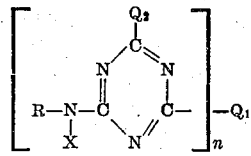

wherein R stands for an aromatic complex which contains one of a group of auxochromes including

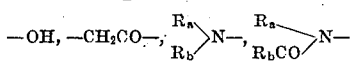

(wherein $R_a$ and $R_b$ represent the same or different alkyl, aryl or aralkyl radicals or a hydrogen atom), $x$ for a hydrogen atom or an alkyl, aralkyl or aryl residue, one of the two residues R and $x$ containing at least one strong acid group, $Q_1$ for a hydrogen atom or a radical which are linked to the carbon atom of the cyanuric nucleus by one of a group of connecting links which contains —O— or —N—, $Q_2$ for a hydrogen atom or a radical which are linked to the carbon atom of the cyanuric nucleus by one of a group of connecting links which contains —O— or —N—, and $n$ for a whole number not higher than the number of the mobile hydrogen atoms originally present in the molecule of the compound corresponding with the radical $Q_1$.

These new products are from colorless to gray and yellowish powders, dissolving in solvents from colorless to yellowish and brownish solutions.

The following examples illustrate the present invention without, however, limiting same.

*Example 1.*

To a fine suspension of 18.5 parts of cyanuric chloride in 500 parts of water there is added slowly and at low temperature a solution of 18.8 parts of 1:3-phenylenediamine-4-sulfonic acid and 5.3 parts of sodium carbonate in 100 parts of water. As soon as the cyanuric chloride has disappeared, there are added once more 5.3 parts of sodium carbonate and 13.6 parts of m-aminoformanilide and the whole is stirred until the m-aminoformanilide has disappeared with formation of the secondary condensation product from one molecular proportion of cyanuric chloride, one molecular proportion of 1:3-phenylenediamine-4-sulfonic acid and one molecular proportion of m-aminoformanilide.

By neutralizing the crude solution of the secondary product obtained according to the preceding paragraph with sodium carbonate, adding 13.6 parts of m-aminoformanilide and boiling the mixture for about one hour, there is obtained the tertiary condensation product from one molecular proportion of cyanuric chloride, one molecular proportion of 1:3-phenylenediamine-4-sulphonic acid and 2 molecular proportions of m-aminoformanilide, which when the solution is cooled, is precipitated in the form of a crystalline grey powder, which dissolves in alkalies without fluorescence. The new product corresponds most probably with the following formula:

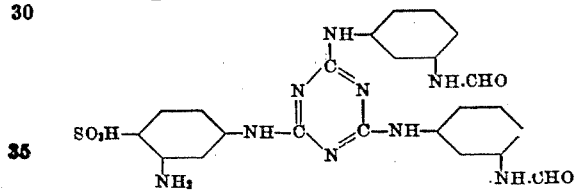

If in this example 1:4-phenylenediamine-3-sulphonic acid be substituted for 1:3-phenylenediamine-4-sulfonic acid, there is obtained a series of isomeric products. The derivatives of p-phenylenediamine are, generally speaking, soluble with greater difficulty than the meta-derivatives. These latter may play the part of diazo-components as well as coupling-components, whereas the unalkylated derivatives of p-phenylenediamine are scarcely applicable except as diazo-components.

*Example 2.*

To a suspension of 18.5 parts of cyanuric chloride in 500 parts of water there are added at ordinary temperature 42 parts of sodium 1.4-phenylenediamine-3-sulfonate. After a short time the hydrochloric acid formed is almost completely neutralized by carefully adding an aqueous solution of 10.6 parts of sodium carbonate. As soon as all p-phenylenediamine sulfonic acid has disappeared, the solution is exactly neutralized with sodium carbonate, treated with 13.6 parts of m-aminoformanilide and heated until the condensation of the tertiary condensation product from 1 molecular proportion of cyanuric chloride, 2 molecular proportions of p-phenylenediamine sulfonic acid and one molecular proportion of m-aminoformanilide is complete. The new product is precipitated by cooling, it is a grey crystalline powder, easily soluble in alkalies without fluorescence.

*Example 3.*

30.2 parts of sodium 1:4-acetylnaphthylenediamine-6-sulfonate are dissolved in 500 parts of water and treated with 9.3 parts of cyanuric chloride in a fine state of subdivision. The mixture is stirred for several hours, the liquid being kept neutral by addition of sodium carbonate. The primary condensation product first formed precipitates and dissolves again while condensing to a secondary condensation product, whereby the acetylnaphthylenediamine-sulfonic acid disappears completely.

By heating the carefully neutralized solution with ammonia, the last remaining mobile atom of chlorine is exchanged, while there is formed the tertiary condensation product from one molecular proportion of cyanuric chloride, 2 molecular proportions of 1.4-acetylnaphthylenediamine-6-sulfonic acid and one molecular proportion of water or ammonia. These products form grey powders freely soluble in alkalies without fluorescence, and containing 2 acetylamino groups.

*Example 4.*

A finely subdivided suspension of 37 parts of cyanuric chloride in 1000 parts of water is mixed with an aqueous solution of 37.6 parts of 1:3-phenylenediamine-4-sulfonic acid and 10.6 parts of soda in 1000 parts of water. The temperature is kept at 0° C. and the mineral acid formed neutralized. As soon as the components have disappeared, there are added 10.8 parts (one half molecular proportion) of p-phenylenediamine; the mixture is stirred during several hours at 40–50° C. and the di-secondary condensation product of the formula:

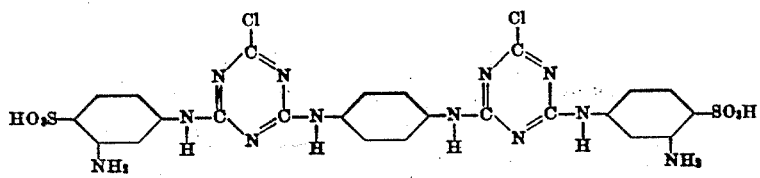

is precipitated with mineral acid. By action of aniline in the heat the 2 mobile atoms of chlorine are exchanged for the aniline residue. The di-tertiary condensation product thus obtained is precipitated with mineral acid. It forms a grey powder, soluble in water with difficulty, easily soluble in alkalies.

If the above described di-secondary condensation product containing still 2 mobile atoms of chlorine is treated with chloro-m-phenylenediamine in the heat, a di-tertiary condensation product is obtained which contains 4 diazotizable amino-groups. The new product corresponds most probably with the following formula:

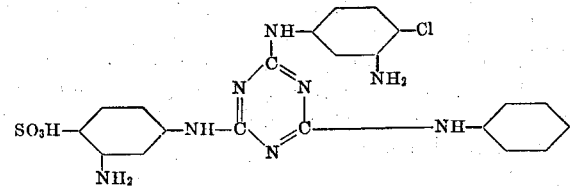 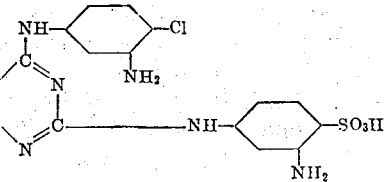

Example 5.

The suspension of the secondary condensation product from 18.5 parts of cyanuric chloride (one molecular proportion) and 2 molecular proportions of p-phenylenediamine-sulfonic acid is neutralized with carbonate of sodium until the compound has completely disappeared with formation of the di-sodium salt. After addition of 23 parts of sodium p-phenylenediamine sulfonate, the mixture is heated at the boiling temperature and about one hour after, the tertiary condensation product from 1 molecular proportion of cyanuric chloride and 3 molecular proportions of p-phenylenediaminesulfonic acid is precipitated with hot mineral acid and filtered immediately. The product thus obtained is freely soluble in alkalies.

Analogous products are obtained, for instance, by treating 1 molecular proportion of cyanuric chloride with two molecular proportions of the reduced condensation product from 1 molecular proportion of m-nitrobenzoylchloride and 1 molecular proportion of 1.3-phenylenediamine-4-sulfonic acid and by exchanging the last mobile atom of chlorine by the aniline residue. The alkali metal salts of the condensation product thus obtained corresponding very probably with the formula:

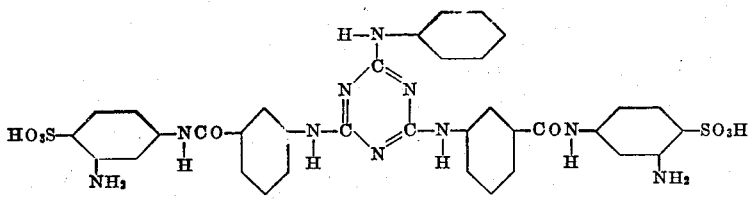

have a notable affinity for the vegetable fibre.

Example 6.

18.5 parts of cyanuric chloride in fine suspension in water are treated with a solution of 31.9 parts of 1:8-aminonaphthol-3:6-disulfonic acid and 13.3 parts of caustic soda solution. As soon as the cyanuric chloride has disappeared the mixture is carefully neutralized and treated with 26.6 parts of caustic soda solution of 30 per cent. strength, and the whole is stirred, first in the cold, for some time, then on the water bath. There is thus formed the tertiary condensation product from one molecular proportion of cyanuric chloride, one molecular proportion of 1:8-aminonaphthol-3.6-disulfonic acid, and 2 molecular proportions of water. If separated with common salt it forms an almost colorless precipitate. The product is very easily soluble in water and alkalies to solutions which do not fluoresce. If the primary condensation product is treated in the same manner with an excess of ammonia or diethylamine, the corresponding tertiary condensation product from one molecular proportion of cyanuric chloride, one molecular proportion of 1:8-aminonaphthol-3:6-disulfonic acid, and two molecular proportions of ammonia or diethylamine is formed, a compound which has similar properties as the above mentioned tertiary condensation product.

Example 7.

To a solution of the primary condensation product from one molecular proportion of cyanuric chloride and one molecular proportion of 2:5-aminonaphthol-7-sulfonic acid there are added 10.8 parts of m-phenylenediamine and the whole is stirred, while warming, at 40–50° C., until the condensation is complete. The compound thus obtained represents the secondary condensation product from 1 molecular proportion of cyanuric chloride with one molecular proportion of 2:5-aminonaphthol-7-sulfonic acid, and one molecular proportion of m-phenylenediamine. By heating with ammonia, the last mobile atom of chlorine is exchanged for the amino group and there is thus formed the tertiary condensation product from one molecular proportion of cyanuric chloride, one molecular proportion of 2:5-aminonaphthol-7-sulfonic acid, one molecular proportion of m-phenylenediamine and one molecular proportion of ammonia. The new product is a grey powder soluble in alkalies without fluorescence and contains one diazotizable aminogroup.

*Example 8.*

18.5 parts of cyanuric chloride in a finely subdivided state are suspended in water and treated with a solution of 31.9 parts of 1:8-aminonaphthol-3:6-disulfonic acid and 13.7 parts of caustic soda solution of 30 per cent. strength. As soon as a clear solution is obtained, the whole is treated with 30 parts of sodium acetate and a solution of 12.9 parts of aniline hydrochloride, while the mixture is stirred until the aniline has almost completely disappeared.

If there be added to the solution of this secondary condensation product from one molecular proportion of cyanuric chloride one molecular proportion of 1:8-aminonaphthol-3:6-disulfonic acid and one molecular proportion of aniline once more 30 parts of crystallized sodium acetate and 12.9 parts of aniline hydrochloride, and if the whole be boiled while stirring, the aniline disappears gradually while the tertiary condensation product from one molecular proportion of cyanuric chloride, one molecular proportion of 1:8-aminonaphthol-3:6-disulfonic acid, and 2 molecular proportions of aniline is formed. It differs clearly from the secondary condensation product by a lower degree of solubility, and forms a grey powder, dissolving in alkalies to solutions that do not fluoresce.

Very similar products are obtained by replacing the aniline once or twice by the corresponding quantities of o- and p-anisidine, p-aminoacetanilide, m-phenylenediamine, m-amino-formanilide, and the like. These primary amines may be exchanged wholly or partly for more complicated amines, such as for instance, m-aminobenzoic acid. o- and p-amino-salicylic acid, aminophthalic acid, 4-sulfo-6-amino-salicylic acid, 4-chloro-6-aminosalicylic-acid, and the like. All these compounds are best employed in form of their neutral sodium salts. The tertiary condensation products are characterized by the presence of one or two carboxylic groups.

*Example 9.*

18.5 parts of finely subdivided cyanuric chloride are suspended in about 1000 parts of water and treated gradually, at 0° C., while stirring, with 26.2 parts of sodium 2:5-aminonaphthol-7-sulfonate, the mixture being always kept feebly acid by addition of a solution of carbonate of sodium. As soon as all cyanuric chloride has disappeared, the whole is heated. By titration of the increasing quantity of hydrochloric acid the exchange of the two atoms of chlorine of the primary condensation product for the OH-groups, one after the other, may thus be exactly followed. The product thus obtained corresponds most probably with the formula:

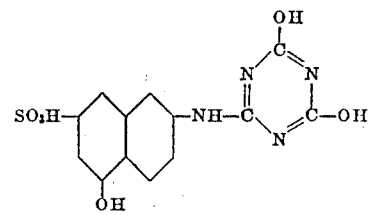

*Example 10.*

An aqueous solution of the primary condensation product from 1 molecular proportion of cyanuric chloride and one molecular proportion of 2:5-aminonaphthol-7-sulfonic acid is treated with a solution of 17.4 parts of m-nitraniline hydrochloride and stirred, while gently warming, until the m-nitraniline has disappeared. The liquid is then treated with ammonia and heated for some time. By addition of mineral acid the tertiary condensation product from one molecular proportion of cyanuric chloride, one molecular proportion of 2:5-aminonaphthol-7-sulfonic acid, one molecular proportion of m-nitraniline, and one molecular proportion of ammonia, may be separated.

The condensation of the primary condensation product from one molecular proportion of cyanuric chloride, and 1 molecular proportion of 2:5-aminonaphthol-7-sulfonic acid with m-aminoformanilide takes place in the same manner. If the secondary condensation product thus obtained be boiled with a slight excess of m-aminoformanilide, the tertiary condensation product from one molecular proportion of cyanuric chloride, one molecular proportion of 2:5-aminonaphthol-7-sulfonic acid and 2 molecular proportions of m-aminoformanilide is formed. The isolated grey powder is also soluble in alkalies without fluorescence, and is not diazotizable, a sign that the hydrogen atom of the free aminogroup has reacted with the atom of chlorine.

Instead of nitraniline or m-aminoformanilide, other amines may be taken, as for instance aniline, p- and m-phenylene-diamines and their sulfo- or carboxylic acids. If in place of the 2:5-aminonaphthol-7-sulfonic acid, 2:8-aminonaphthol-6-sulfonic acid is employed, analogous products are obtained.

Example 11.

To a suspension of 18.5 parts of cyanuric chloride in 20 times their weight of water there are added, by stirring in the cold, 26.1 parts of 2:8-aminonaphthol-6-sulfonic acid. After half an hour the freed hydrochloric acid (3.6 parts) is neutralized with the corresponding quantity of sodium carbonate. The mixture is then treated with 11.6 parts of sodium phenolate and stirred until the liquid becomes neutral. As soon as this is obtained there are added 19.5 parts of the sodium salt of the sulfanilic acid and the whole is boiled until the sulfanilic acid has almost disappeared. After cooling the tertiary condensation product from one molecular proportion of cyanuric chloride, one molecular proportion of 2:8-aminonaphthol-6-sulfonic acid, one molecular proportion of phenol and one molecular proportion of sulfanilic acid thus obtained is precipitated by means of mineral acid. The product is a grey powder, easily soluble in a solution of sodium carbonate. Its alkaline solutions do not fluoresce. The new compound corresponds very probably with the formula:

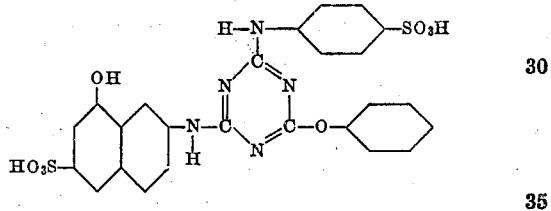

Example 12.

108.6 parts of the reduced N-condensation product from nitrobenzoylchloride and 1-(3'-aminobenzoyl)-amino-8-naphthol-3:6-disulfonic acid are dissolved in water by means of 26.6 parts of caustic soda solution of 30 per cent strength and treated, first in the cold, then by gently warming, with 18.5 parts of cyanuric chloride in fine state of subdivision. The secondary condensation product thus obtained corresponding to the following formula:

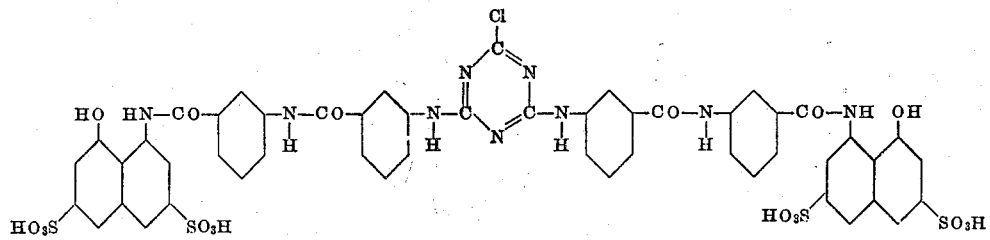

is then treated during 2 hours with an excess of aniline at 100° C., and thus transformed into the tertiary condensation product. The anline in excess being eliminated by means of hydrochloric acid, the condensation product is obtained in form of a gelatinous mass which may be purified by dialysis. It is, when dried, a grey powder, soluble in alkalies, to solutions that do not fluoresce.

Other more complicated aminonaphthol derivatives may also be obtained in the following manner:

The solution of the mono-condensation product from 1 molecular proportion of cyanuric acid and one molecular proportion of 2:5-aminonaphthol-7-sulfonic acid is treated with an aqueous solution of 5.04 parts (one half molecular proportion) of p-phenylenediamine. The condensation is achieved by neutralizing the hydrochloric acid formed and feebly warming, whereby a compound of the formula:

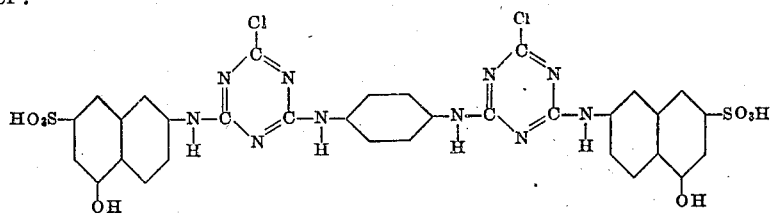

is obtained, $R_1$ being the residue of 2:5-aminonaphtholsulfonic acid and $R_2$ the residue of the m-phenylenediamine.

If to this solution 26 parts of sodium 2:5-amino-naphthol-7-sulfonic acid are added, the whole being boiled for some time, the last remaining 2 mobile atoms of chlorine are exchanged and the corresponding di-tertiary condensation product is thus formed, a compound which contains in one molecule 4 aminonaphthol residues.

Instead of p-phenlyenediamine, other compounds having at least two groups capable of reaction with cyanuric halides may be taken, such as the aliphatic and cyclic diamines (for instance m-phenylene-diamine, benzidine, and diamino-diphenylether).

Example 13.

The solution of the condensation product from 1 molecular proportion of cyanuric chloride and 2 molecular proportions of 1:8- aminonaphthol-3:6-disulfonic acid is treated with a solution of 31 parts of 1:8-aminonaphthol-3:6-disulfonic acid in 150 parts of water, 13.3 parts of caustic soda solution of 30 per cent strength and 30 parts of crystallized sodium acetate, the whole being heated on the water bath until the aminonaphtholsulfonic acid has disappeared. Common salt is added and, by cooling, the tertiary condensation product from 1 molecular proportion of cyanuric chloride and 3 molecular proportions of 1:8-aminonaphthol-3:6-disulfonic acid is precipitated in form of gelatinous flocks which are filtered and dried. The product thus obtained does not contain any mobile atom of chlorine.

In an analogous manner there may be obtained tertiary condensation products starting from other aminonaphthols, such as for instance, 2:5-aminonaphthol-7-sulfonic acid and 2:8-aminonaphthol-6-sulfonic acid. There may also easily be obtained mixed tertiary condensation products with 2 or 3 different aminonaphtholsulfonic acids, which may be wholly or partly replaced by non-sulfonated aminonaphthols, such as for instance, 2:7-aminonaphthol.

Example 14.

The aqueous solution of the secondary condensation product from 1 molecular proportion of cyanuric chloride and 2 molecular proportions of 2:5-aminonaphthol-7-sulfonic acid is exactly neutralized by means of sodium carbonate and there are added 24.4 parts of m-toluylenediamine, the whole being boiled for 2 hours in a reflux apparatus. After cooling, the tertiary condensation product from 1 molecular proportion of cyanuric chloride, 2 molecular proportions of 2:5-aminonaphthol-7-sulfonic acid and 1 molecular proportion of toluylenediamine is precipitated by means of mineral acid and a grey powder is thus obtained. The product dissolves in alkalies to solutions which do not fluoresce, and it contains a free aminogroup.

If p-phenylenediamine is substituted in this example for m-toluylenediamine, an analogous product is obtained.

Bicyclic diamines also react in an analogous manner.

18.4 parts of finely pulverized benzidine are introduced, while stirring, into a solution of the secondary condensation product from 18.5 parts (1 molecular proportion) of cyanuric chloride and 2 molecular proportions of 1:8-aminonaphthol-3:6-disulfonic acid in 1000 parts of water. After boiling for 2 hours, while stirring, the clear solution is acidified and filtered in the heat. The product thus obtained represents the tertiary condensation product from 1 molecular proportion of cyanuric chloride, 2 molecular proportions of 1:8-aminonaphthol-3:6-disulfonic acid and 1 molecular proportion of benzidine and corresponds with the formula:

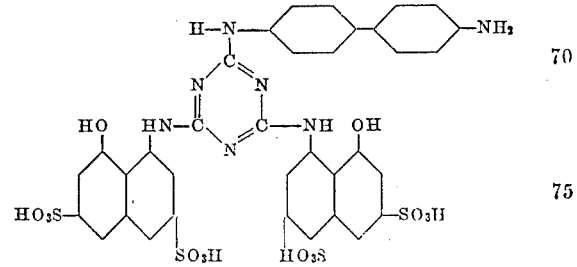

Example 15.

18.5 parts of cyanuric chloride are suspended in 500 parts of water at 0° C. and treated, while stirring, with a solution of 26.1 parts of sodium 2-amino-8-naphthol-6-sulfonate. As soon as the aminonaphtholsulfonic acid has disappeared, the mixture is exactly neutralized with sodium carbonate and a solution of 32.7 parts of m-aminophenol in 36 parts of hydrochloric acid of 30 per cent strength and 200 parts of water is added. There is formed, at first in the cold, the secondary condensation product, after which 14 parts of crystallized sodium acetate are added and the whole is heated at the boiling temperature. The tertiary condensation product thus obtained is precipitated with acid and separated. It dissolves in water with difficulty, very easily in alkalies without fluorescence and corresponds most probably with the following general formula:

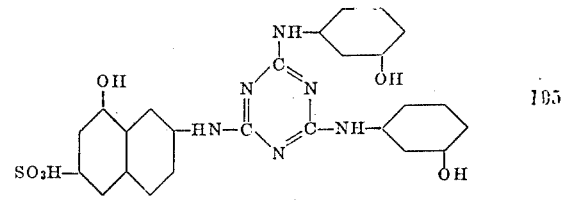

What we claim is:

1. The herein described process of producing new intermediate products for the synthesis of azo-dyes by condensing, in a first phase, one molecular proportion of a cyanuric trihalide with one molecular proportion of a compound of the aromatic series having, firstly, a non-tertiary amino-group, secondly, containing one of a group of auxochromes including

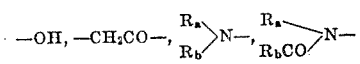

(wherein $R_a$ and $R_b$ represent the same or different alkyl, aryl or aralkyl radicals or a hydrogen atom), and which, thirdly, contains at least one strong acid group, then condensing successively, in the second phase, with the condensation products thus obtained, one of a group of compounds which contains at least a primary amino or a hydroxy group, and, in the third phase, condensing with the condensation products of the second phase, compounds of a group of compounds which contain amino or hydroxy groups, at least one of the three phases being carried out in water.

2. The herein described process of producing new intermediate products for the synthesis of azo-dyes by condensing, in a first phase, one molecular proportion of a cyanuric trihalide with one molecular proportion of a compound of the aromatic series derived from a hydrocarbon which contains not more than 10 carbon atoms and having, firstly, a non-tertiary amino-group, secondly, containing one of a group of auxochromes including

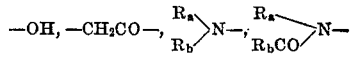

(wherein $R_a$ and $R_b$ represent the same or different alkyl, aryl or aralkyl radicals or a hydrogen atom), and which, thirdly, contains at least one strong acid group, then condensing successively, in the second phase, with the condensation products thus obtained, one of a group of compounds which contains at least a primary amino or a hydroxy group, and, in the third phase, condensing with the condensation products of the second phase, compounds of a group of compounds which contain amino or hydroxy groups, at least one of the three phases being carried out in water.

3. The herein described process of producing new intermediate products for the synthesis of azo-dyes by condensing, in a first phase, one molecular proportion of a cyanuric trihalide with one molecular proportion of a primary aromatic amine derived from a hydrocarbon which contains not more than 10 carbon atoms and having at least one of a group of auxochromes including

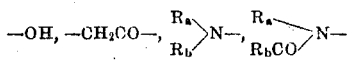

(wherein $R_a$ and $R_b$ represent the same or different alkyl, aryl or aralkyl radicals or a hydrogen atom), and which contains at least one strong acid group, then condensing successively, in the second phase, with the condensation products thus obtained, one of a group of compounds which contains at least a primary amino or a hydroxy group, and, in the third phase, condensing with the condensation products of the second phase, compounds of a group of compounds which contain amino or hydroxy groups, at least one of the three phases being carried out in water.

4. The herein described process of producing new intermediate products for the synthesis of azo-dyes by condensing, in a first phase, one molecular proportion of a cy-
anuric trihalide with one molecular proportion of a primary aromatic amine derived from a hydrocarbon which contains not more than 10 carbon atoms and having at least still one of a group of auxochromes including

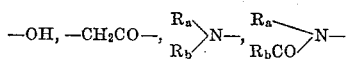

(wherein $R_a$ and $R_b$ represent the same or different alkyl, aryl or aralkyl radicals or a hydrogen atom), and which contains at least one strong acid group, then condensing successively, in the second phase, with the condensation products thus produced, aromatic compounds which contain primary amino or hydroxy groups, and, in the third phase, condensing with the condensation products of the second phase, aromatic compounds which contain amino or hydroxy groups, at least one of the three phases being carried out in water.

5. The herein described process of producing new intermediate products for the synthesis of azo-dyes by condensing, in a first phase, one molecular proportion of a cyanuric trihalide with one molecular proportion of a primary aromatic amine derived from a hydrocarbon which contains not more than 10 carbon atoms and having at least still one of a group of auxochromes including

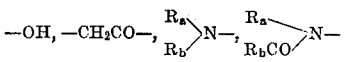

(wherein $R_a$ and $R_b$ represent the same or different alkyl, aryl or aralkyl radicals or a hydrogen atom), and which contains at least one sulfo group, then condensing successively, in the second phase, with the condensation products thus produced, aromatic compounds which contain primary amino or hydroxy groups, and, in the third phase, condensing with the condensation products of the second phase, aromatic compounds which contain amino or hydroxy groups, at least one of the three phases being carried out in water.

6. The herein described process of producing new intermediate products for the synthesis of azo-dyes by condensing, in a first phase, one molecular proportion of a cyanuric trihalide with one molecular proportion of a primary aromatic amine derived from a hydrocarbon which contains not more than 10 carbon atoms and having at least still one of a group of auxochromes including

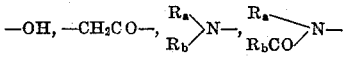

(wherein $R_a$ and $R_b$ represent the same or different alkyl, aryl or aralkyl radicals or a hydrogen atom), and which contains at least one sulfo group, then condensing successively, in the second and third phases, with the condensation products so produced, one aromatic primary amine, at least one of the three phases being carried out in water.

7. As new intermediate products for the synthesis of azo-dyes the compounds of the general formula

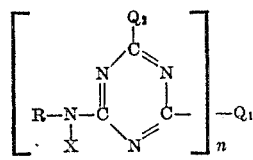

wherein R means an aromatic complex which contains at least one of a group of auxochromes including

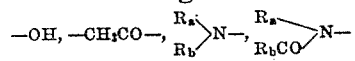

(wherein $R_a$ and $R_b$ represent the same or different alkyl, aryl or aralkyl radicals or a hydrogen atom), $x$ a hydrogen atom or an alkyl, aralkyl or aryl residue, one of the two residues R and $x$ containing at least one strong acid group, $Q_1$ a hydrogen atom or a radical which is linked to the carbon atom of the cyanuric nucleus by one of a group of connecting links which contains —O— or —N—, $Q_2$ one hydrogen atom or one radical which is linked to the carbon atom of the cyanuric nucleus by one of a group of connecting links which contains —O— or —N—, and $n$ a whole number not higher than the number of the mobile hydrogen atoms originally present in the amino and hydroxy groups of the compound corresponding with the radical $Q_1$, which products are from colorless to gray and yellowish powders, dissolving in solvents from colorless to yellowish and brownish solutions.

8. As new intermediate products for the synthesis of azo-dyes the compounds of the general formula:

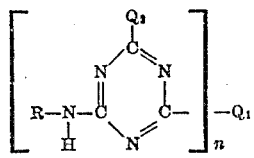

wherein R means an aromatic residue derived from a hydrocarbon which contains not more than 10 carbon atoms and which, firstly, contains at least one strong acid group, secondly, contains at least one of a group of auxochromes including

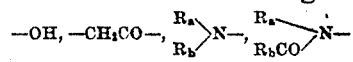

(wherein $R_a$ and $R_b$ represent the same or different alkyl, aryl or aralkyl radicals or a hydrogen atom), $Q_1$ a hydrogen atom or a radical which is linked to the carbon atom of the cyanuric nucleus by one of a group of connecting links which contains —O— or —N—, $Q_2$ one hydrogen atom or one radical which is linked to the carbon atom of the cyanuric nucleus by one of a group of connecting links which contains —O— or —N—, and $n$ a whole number not higher than the number of the mobile hydrogen atoms originally present in the molecule of the radical $Q_1$ before the condensation, which products are from colorless to gray and yellowish powders, dissolving in solvents from colorless to yellowish and brownish solutions.

9. As new intermediate products for the synthesis of azo-dyes the compounds of the general formula:

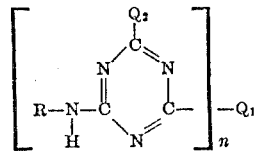

wherein R means an aromatic residue derived from a hydrocarbon which contains not more than 10 carbon atoms and which, firstly, contains at least one strong acid group, secondly, contains at least one of a group of auxochromes including

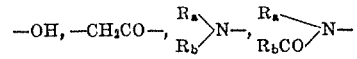

(wherein $R_a$ and $R_b$ represent the same or different alkyl, aryl or aralkyl radicals or a hydrogen atom), $Q_1$ and $Q_2$ being the same or different alkyl, aryl or aralkyl radicals linked to the carbon atom of the cyanuric nucleus by one of a group of connecting links which contains —O— or —N—, and $n$ a whole number smaller than three, which products are from colorless to gray and yellowish powders, dissolving in solvents from colorless to yellowish and brownish solutions.

10. As new intermediate products for the synthesis of azo-dyes the compounds of the general formula

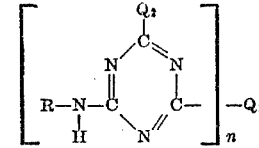

wherein R means an aromatic residue derived from a hydrocarbon which contains not more than 10 carbon atoms and which, firstly, contains at last one sulfo group, secondly, contains at least one of a group of auxochromes including

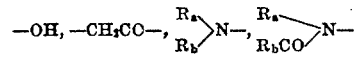

(wherein $R_a$ and $R_b$ represent the same or different alkyl, aryl or aralkyl radicals or a hydrogen atom), $Q_1$ and $Q_2$ being the same or different aryl radicals linked to the carbon atom of the cyanuric nucleus by one of a group of connecting links which contains —O— or —N—, and $n$ a whole number smaller than three, which products are from colorless to gray and yellowish powders, dissolving in solvents from colorless to yellowish and brownish solutions.

11. As new intermediate products for the synthesis of azo-dyes the compounds of the general formula:

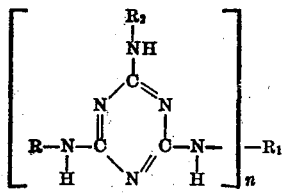

wherein R means an aromatic residue derived from a hydrocarbon which contains not more than 10 carbon atoms and which, firstly, contains at least one sulfo group, secondly, contains at least one of a group of auxochromes including

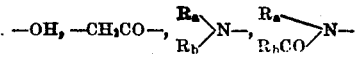

(wherein $R_a$ and $R_b$ represent the same or different alkyl, aryl or aralkyl radicals or a hydrogen atom), $R_1$ and $R_2$ being radicals of aromatic compounds, and $n$ a whole number smaller than three, which products are from colorless to gray and yellowish powders, dissolving in solvents from colorless to yellowish and brownish solutions.

12. As new intermediate products for the synthesis of azo-dyes the compounds of the general formula:

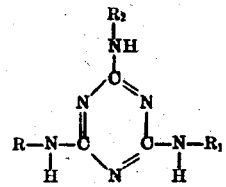

wherein R means an aromatic residue derived from a hydrocarbon which contains not more than 10 carbon atoms and which, firstly, contains at least one sulfo group, secondly, contains at least one of a group of auxochromes including

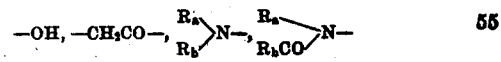

(wherein $R_a$ and $R_b$ represent the same or different alkyl, aryl or aralkyl radicals or a hydrogen atom), $R_1$ and $R_2$ being radicals of aromatic compounds, which products are from colorless to gray and yellowish powders, dissolving in solvents from colorless to yellowish and brownish solutions.

In witness whereof we have hereunto signed our names this 6th day of July, 1923.

HERMANN FRITZSCHE.
EDUARD KRUMMENACHER.
HANS GUBLER.
OTTO KAISER.